(12) United States Patent
Lim et al.

(10) Patent No.: US 9,037,148 B2
(45) Date of Patent: May 19, 2015

(54) APPARATUS FOR SUPPORTING A MOBILE STATION TO COMMUNICATE WITH TWO OR MORE NETWORKS IN A MOBILE COMMUNICATION SYSTEM AND METHOD THEREOF

(75) Inventors: Dongguk Lim, Anyang-si (KR);
Hyunwoo Lee, Anyang-si (KR);
Hangyu Cho, Anyang-si (KR);
Yeonghyeon Kwon, Anyang-si (KR);
Dongcheol Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 249 days.

(21) Appl. No.: 13/806,013

(22) PCT Filed: Jul. 1, 2011

(86) PCT No.: PCT/KR2011/004858
§ 371 (c)(1),
(2), (4) Date: Dec. 20, 2012

(87) PCT Pub. No.: WO2012/002771
PCT Pub. Date: Jan. 5, 2012

(65) Prior Publication Data
US 2013/0095845 A1    Apr. 18, 2013

(30) Foreign Application Priority Data
Jul. 2, 2010  (KR) .................. 10-2010-0063783

(51) Int. Cl.
*H04W 72/08*    (2009.01)
*H04W 72/04*    (2009.01)
*H04W 36/00*    (2009.01)
*H04W 76/02*    (2009.01)

(52) U.S. Cl.
CPC ........ *H04W 72/085* (2013.01); *H04W 36/0066* (2013.01); *H04W 76/026* (2013.01); *H04W 72/044* (2013.01)

(58) Field of Classification Search
USPC .............................. 455/450–452.2
See application file for complete search history.

(56) References Cited

U.S. PATENT DOCUMENTS

2005/0272403 A1 * 12/2005 Ryu et al. ................ 455/403

FOREIGN PATENT DOCUMENTS

| KR | 10-2010-0032269 | 3/2010 |
| KR | 10-2010-0061003 | 6/2010 |
| KR | 10-2010-0066875 | 6/2010 |

OTHER PUBLICATIONS

PCT International Application No. PCT/KR2011/004858, Notification of Transmittal of the International Search Report and the Written Opinion of the International Searching Authority, or Declaration dated Feb. 29, 2012, 8 pages.

*Primary Examiner* — Kashif Siddiqui
(74) *Attorney, Agent, or Firm* — Lee, Hong, Degerman, Kang & Waimey

(57) ABSTRACT

An apparatus for supporting a mobile station (MS) to perform a communication using a plurality of networks in a mobile communication system and method thereof are disclosed. According to the present invention, a serving base station (BS) of the MS receives information on at least one heterogeneous network from a BS of each of the at least one heterogeneous network. The serving BS of the MS selects at least one of a heterogeneous network to be allocated to the MS and a channel of the heterogeneous network based on the received information on the at least one heterogeneous network. And, the serving BS of the MS transmits an information on the selected heterogeneous network to the MS.

12 Claims, 5 Drawing Sheets

APPARATUS FOR SUPPORTING A MOBILE STATION TO COMMUNICATE WITH TWO OR MORE NETWORKS IN A MOBILE COMMUNICATION SYSTEM AND METHOD THEREOF

CROSS-REFERENCE TO RELATED APPLICATIONS

This application is the National Stage filing under 35 U.S.C. 371 of International Application No. PCT/KR2011/004858, filed on Jul. 1, 2011, which claims the benefit of earlier filing date and right of priority to Korean Patent Application No. 10-2010-0063783, filed on Jul. 2, 2010, the contents of which are all hereby incorporated by reference herein in their entirety.

TECHNICAL FIELD

The present invention relates to a mobile communication system, and more particularly, to a method of supporting a mobile station to perform a communication using at least two heterogeneous networks.

BACKGROUND ART

Generally, various radio access technologies (hereinafter abbreviated 'RAT') for supporting mobile stations of various species exist in a radio environment. In order to transmit and receive signals by accessing various networks existing in a radio environment, a mobile station supports multiple modes having at least two wire/wireless access interfaces.

In order to transmit and receive signals more efficiently in such an environment, the mobile station is able to transmit a signal using heterogeneous network transmission (multi-RAT) to receive a best service at a current timing point without being restrained by a specific RAT or network or to transmit and receive signals on best condition.

A mobile station belonging to a specific network needs to be aware of information on a heterogeneous network to perform a communication via the heterogeneous network. However, a method for enabling a mobile station belonging to a specific network to obtain information on a heterogeneous network or a method for a mobile station to efficiently transmit a signal by raising throughput using at least two heterogeneous network has not be proposed yet.

DISCLOSURE OF INVENTION

Technical Problem

Accordingly, the present invention is directed to a method of supporting a mobile station to perform a communication using at least two heterogeneous networks that substantially obviates one or more of the problems due to limitations and disadvantages of the related art.

An object of the present invention is to provide a method of supporting a mobile station to perform a communication using a plurality of networks.

Another object of the present invention is to provide an apparatus for supporting a mobile station to perform a communication using a plurality of networks.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

Solution to Problem

To achieve these and other advantages and in accordance with the purpose of the present invention, as embodied and broadly described, a method of supporting a mobile station (MS) to perform a communication using a plurality of networks in a mobile communication system according to one embodiment of the present invention includes the steps of receiving, at a serving base station (BS) of the mobile station receives information on at least one heterogeneous network from a base station of each of the at least one heterogeneous network, determining, at the serving base station, a heterogeneous network to be allocated to the mobile station and a channel of the heterogeneous network based on the received information on the at least one heterogeneous network, and transmitting, at the serving base station, an information on the heterogeneous network determined to be allocated to the mobile station to the mobile station.

Preferably, the method further includes the step of transmitting, at the serving BS, a request for the information on the heterogeneous network to the base station of each of the at least one heterogeneous network.

Preferably, the method further includes the steps of transmitting, at the serving BS, a request for a channel status measurement for the channel of the allocated heterogeneous network to the mobile station, receiving, at the serving BS, a channel status measurement result for the channel of the allocated heterogeneous network from the mobile station, and allocating, at the serving BS, a specific channel having a best channel status to the mobile station based on the channel status measurement result.

To further achieve these and other advantages and in accordance with the purpose of the present invention, a base station (BS) for supporting a mobile station (MS) to perform a communication using a plurality of networks in a mobile communication system according to another embodiment of the present invention includes a receiving module configured to receive information on at least one heterogeneous network corresponding to a heterogeneous for the mobile station from the base station of each of the at least one heterogeneous network, a processor configured to determine a heterogeneous network to be allocated to the mobile station and a channel of the heterogeneous network based on the received information on the at least one heterogeneous network, and a transmitting module configured to transmit an information on the determined heterogeneous network to the mobile station.

Preferably, the base station device further includes a transmitting module configured to transmit a signal for requesting the information on the heterogeneous network to the base station of each of the at least one heterogeneous network.

Preferably, the base station device further includes a transmitting module configured to transmit a signal for requesting a channel status measurement for the channel of the allocated heterogeneous network to the mobile station, a receiving module configured to receive a channel status measurement result for the channel of the allocated heterogeneous network from the mobile station, and a processor configured to allocate a specific channel having a best channel status to the mobile station based on the channel status measurement result.

It is to be understood that both the foregoing general description and the following detailed description are exemplary and explanatory and are intended to provide further explanation of the invention as claimed.

Advantageous Effects of Invention

According to embodiments of the present invention, a mobile station performs a communication using at least two heterogeneous networks, thereby enabling efficient signal transmission and reception.

According to embodiments of the present invention, a mobile station performs a communication using at least two heterogeneous networks, thereby raising communication throughput.

It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Figure 1:
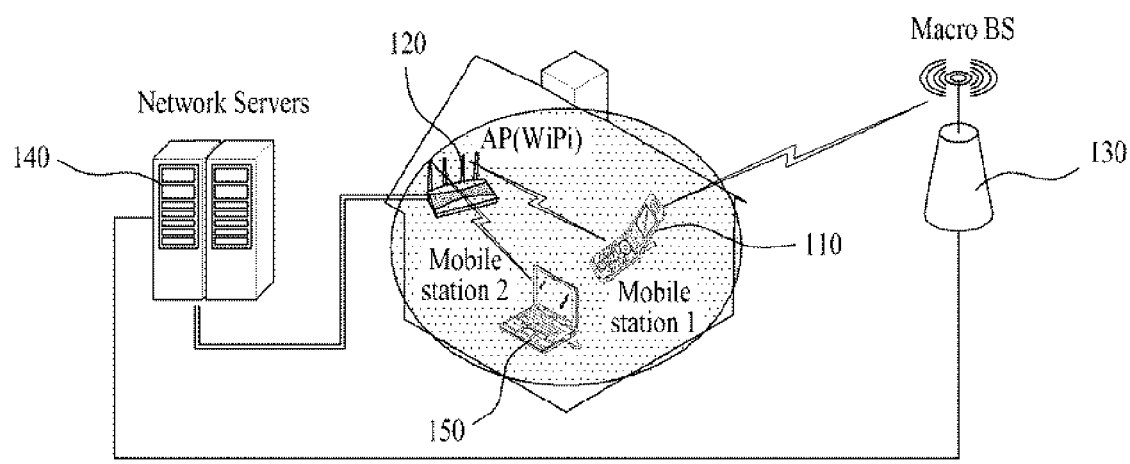
FIG. 1 is a diagram of a communication environment in which at least two heterogeneous networks (e.g., a plurality of RATs) exist.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, they are applicable to other random mobile communication systems except unique features of 3GPP LTE.

Occasionally, to prevent the present invention from getting more vague, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a mobile terminal is a common name of such a mobile or fixed user stage device as a user equipment (UE), a mobile station (MS), Advanced MS and the like and that a base station is a common name of such a random node of a network stage communicating with a terminal as a node B, eNode B, a base station, an access point (AP) and the like.

In a mobile communication system, a mobile station can receive information in downlink from a base station. The user equipment is also able to transmit information in uplink. The information transmitted/received by the user equipment includes data and various kinds of control information. And, various physical channels exist according to types and usages of the information transmitted or received by the mobile station.

In a current communication environment, at least two heterogeneous networks different from each other can exist. For instance, there can exist various kinds of heterogeneous networks including WiMAX network, which is one example for a mobile communication system, WiFi network using WiFi network and the like. In this case, a heterogeneous network means a network that uses a communication scheme different from a communication scheme used by a specific network with reference to the specific network. And, a heterogeneous mobile station (or a heterogeneous user equipment) means a mobile station belonging to a heterogeneous network that uses a communication scheme different from that of a specific network.

For instance, with reference to WiMAX network and a mobile station belonging to the WiMAX network, since WiFi network uses a communication scheme different from that of the WiMAX network, the WiFi network corresponds to a heterogeneous network and a mobile station belonging to the WiFi network corresponds to a heterogeneous mobile station. On the contrary, with reference to WiFi network, WiMAX network becomes a heterogeneous network and a mobile station belonging to the WiMAX network can become a heterogeneous mobile station.

'Multi-mode mobile station' used by the present invention means a mobile station that supports a use of at least two heterogeneous networks (or a plurality of RATs). 'WiFi' means a short-range communication network (e.g., LAN) for enabling a ultra high-speed internet service within a predetermined distance from a radio access device installed spot (e.g., AP). The WiFi uses a radio or infrared transmission scheme and is frequently called Wireless LAN.

In a wireless or radio environment, a multi-mode mobile station is able to use a heterogeneous network existing to support a heterogeneous mobile station as well as a serviced radio access technology (hereinafter abbreviated RAT) in order to efficiently transmit or receive signals or to enhance throughput. In particular, a multi-mode mobile station, which supports a plurality of RATs to use at least two heterogeneous networks, is able to transmit and receives signal using a different RAT capable of providing a best service in a current situation of the mobile station, without being restrained by a specific RAT. The number of heterogeneous networks (i.e., a plurality of RATs) accessed by a multi-mode mobile station to transmit and receive signals can be 2 or higher. Therefore, the multi-mode mobile station can transmit/receive signals with a serving base station and a base station using a different RAT or base stations using heterogeneous network (or heterogeneous RAT) individually or cooperatively.

FIG. 1 is a diagram of a communication environment in which at least two heterogeneous networks (e.g., a plurality of RATs) exist.

Referring to FIG. 1, a mobile station is able to transmit and receive signals using at least two heterogeneous networks (or a plurality of RATs). For instance, FIG. 1 shows that a mobile station transmits and receives signals using a first network (e.g., WiMAX network) and a second network (e.g., WiFi network). A mobile station 1 110 is a multi-mode mobile station capable of using at least two heterogeneous networks, i.e., a multi-mode mobile station capable of supporting a plurality of RATs. As exemplarily shown in FIG. 1, the mobile station 1 110 supports multiple modes to enable signals to be transmitted and received via the WiFi and WiMAX networks corresponding to the heterogeneous networks different from each other. An access point (hereinafter abbreviated AP) 120 corresponding to a base station of the WiFi network and a base station 130 of the WiMAX network can communicate with each other via wireless or wire link for the information exchange and data transceiving in-between. Therefore, the AP 120, which is a base station of a second network, is able to directly communicate with a macro base station 130, which is a base station of a first network, to support the mobile station 1 110. And, the AP 120, which is the base station of the second network, can be connected with the base station 130 via a network server 140.

Although FIG. 1 shows that the AP 120 supports a mobile station using a single RAT only, the AP 120 is able to support mobile stations using at least two RATs in a manner of operating in multi-mode like the mobile station. For instance, although WiFi is supported only for clarity of the description with reference to FIG. 1, the AP 120 is able to simultaneously support a WiMAX mobile station (e.g., the mobile station 1 110) as well as a WiFi mobile station 150 (e.g., a mobile station 2). And, it is possible for the AP 120 to communicate with the base station (e.g., a macro base station) of the second network. Moreover, no limitation is put on the types and number of heterogeneous networks (i.e., a plurality of RATs) used by the mobile station 1 110 for signal transmission and reception. Since the mobile station 1 110 is a multi-mode mobile station capable of supporting a plurality of RATs of the heterogeneous networks, the mobile station 1 110 transmit/receive signals with each of the AP 120 and the macro base station 130 or is able to transmit/receive signals with both of the AP 120 and the macro base station 130.

The mobile station 1 110, which transmits and receives signals using the WiFi AP 120 (or WMAN), accesses a heterogeneous network existing in a wireless environment or a heterogeneous network by recognizing a wireless LAN (WLAN) of a different RAT and then receives signals from the AP 120 or transmits signals to the AP 120. Thus, in order for the mobile station 1 110 to transmit signals by accessing a heterogeneous network, a serving base station to which the mobile station 1 110 belongs needs to transmit information on the heterogeneous network to the mobile station 1 110 or the mobile station 1 110 needs to be aware of information on a heterogeneous network by detecting a signal of the heterogeneous network. Based on the information on the heterogeneous network, the mobile station 1 110 is able to transceive signals with the heterogeneous network. In the following description, a method for a mobile station to obtain information on a heterogeneous network according to an embodiment is explained.

Figure 2:
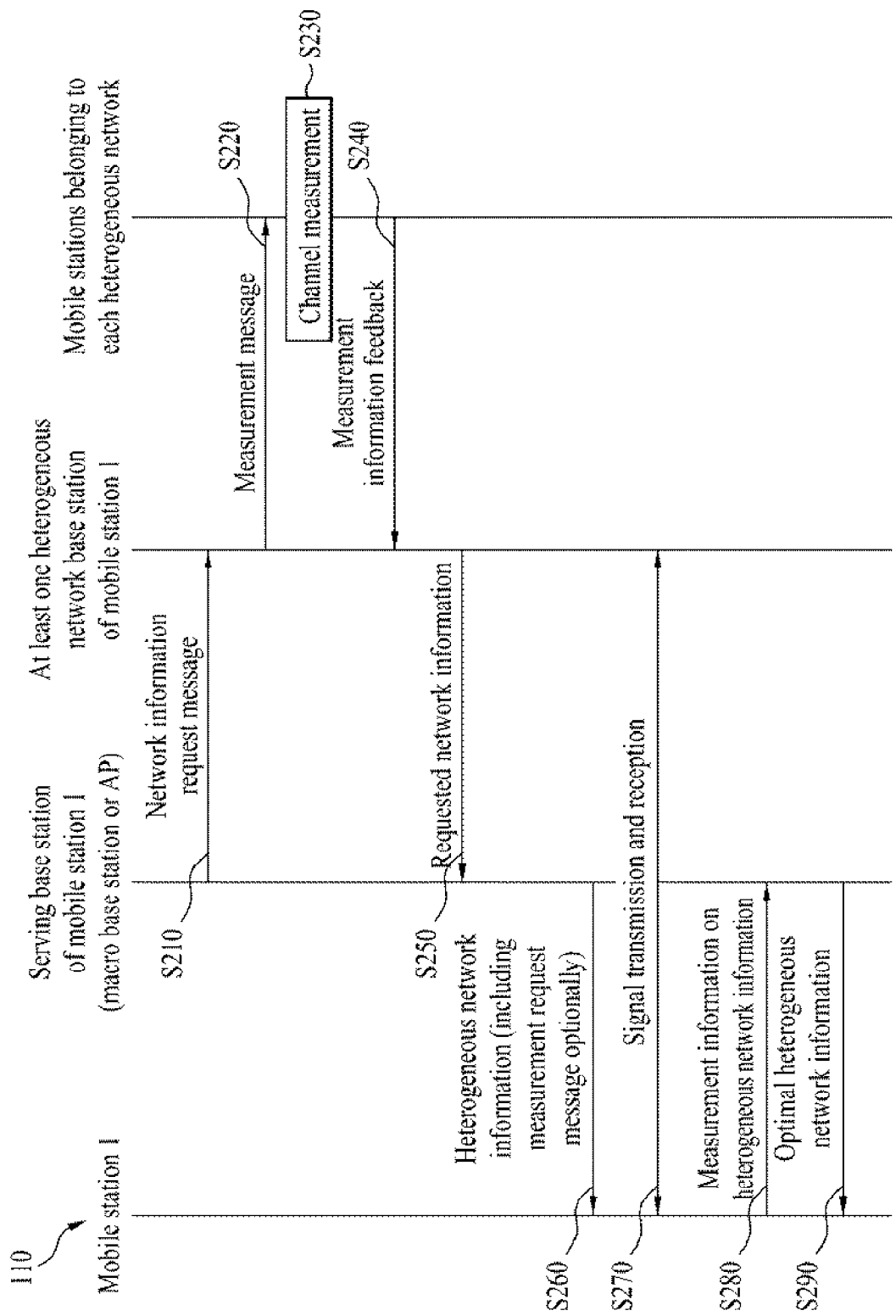
FIG. 2 is a diagram for one example of a process for a mobile station to obtain information on a heterogeneous network.

FIG. 2 is a diagram for one example of a process for a mobile station to obtain information on a heterogeneous network.

Referring to FIG. 2, a plurality of heterogeneous networks for a mobile station 1 110 can exist as well as a network to which a mobile station 2 150 belongs. Yet, for clarity and convenience of the following description, a network, to which a mobile station 1 110 belongs, and a network corresponding to a heterogeneous type are described as central figures for example.

A serving base station (e.g., a macro base station of WiMAX, WiFi AP, etc.) of a mobile station 1 110 obtains information on a heterogeneous network available for the mobile station 1 110 and is then able to transmit the obtained information to the mobile station 1 110. For this, in order to obtain information on an adjacent heterogeneous network, the serving base station of the mobile station 1 110 is able to make a request for an information on a specific heterogeneous network to the corresponding to the specific heterogeneous network via a backbone network or an air interface connected to at least one or more heterogeneous networks [S210]. In doing so, in order to make a request for the information on the heterogeneous network, the serving base station of the mobile station 1 is able to obtain necessary information by sending AAI_MR-ind (Multi-RAT-indicator) or AAI_MR-REQ (advance air interface_multi-Rat-request) message to a heterogeneous network base station. Moreover, the information on the heterogeneous network can be obtained using a handover message. In this case, the heterogeneous network is the network to which a mobile station 2, a mobile station 3, . . . a mobile station K belong and a plurality of the heterogeneous networks can exist.

Thus, the serving base station of the mobile station 1 110 is able to transmit a signal to a base station of each of at least one heterogeneous network via a specific channel or a common channel on a band used by the at least one heterogeneous network. And, the serving base station of the mobile station 1 110 may send a message for requesting an information on the at least one heterogeneous network to each of the at least one heterogeneous network via a specific channel or a common channel on a band used by each of the at least heterogeneous network. The request message sent by the serving base station of the mobile station 1 110 to the base station of each of the at least one heterogeneous network is able to use a common signal or a signal differing in each of the at least one heterogeneous network.

Having received the request message from the serving base station of the mobile station 1 110, the base station of each of the at least one heterogeneous network may transmit a measurement message or a measurement indicator (measurement_indicator) to each of the mobile stations (e.g., mobile station 2, mobile station 3, . . . mobile station K) operating in the corresponding heterogeneous network [S220]. In this case, the measurement message is the message for enabling each mobile station (e.g., mobile station 2, mobile station 3, . . . mobile station K) to measure a channel status, a channel quality, a signal to interference plus noise ratio), a carrier to interference plus noise ratio and the like using a signal received from a base station of a network, to which the corresponding mobile station belongs, and the like. Such a measurement message can be transmitted by a base station of each heterogeneous network to each mobile station by broadcasting, multicasting or unicasting.

Having received the measurement message from the base station to which the corresponding heterogeneous mobile station belongs, each of the heterogeneous mobile stations (e.g., mobile station 2, mobile station 3, . . . mobile station K) is able to perform a measurement through a channel selection according to a current channel status (e.g., busy, idle) as well as a measurement on a whole channel for a specific radio [S230]. In particular, each of the heterogeneous mobile stations (e.g., mobile station 2, mobile station 3, . . . , mobile station K) is able to perform a measurement on a specific region selectively for a random RAT [S230]. Thereafter, each of the heterogeneous mobile stations (e.g., mobile station 2, mobile station 3, . . . mobile station K) is able to feed back the measurement information to the serving station to which the corresponding mobile station belongs [S240].

The serving base station of each of the at least one heterogeneous network collects all the measurement information transmitted by each of the heterogeneous mobile stations (e.g., mobile station 2, mobile station 3, . . . mobile station K) and then transmits all the collected measurement information to the serving base station of the mobile station 1 110 or is able to transmit the information on the region or channel available for the serving base station of the mobile station 1 110 [S250]. The information transmitted by each of the heterogeneous mobile stations (e.g., mobile station 2, mobile station 3, . . . mobile station K) to its serving base station can contain channel information (e.g., a channel quality, an SINR, an interference level, a channel ID, a channel matrix, etc.) within the band of the network to which the corresponding heterogeneous mobile station (e.g., mobile station 2, mobile station 3, . . . mobile station K) belongs. The serving base station of each of the heterogeneous mobile stations (e.g., mobile station 2, mobile station 3, . . . mobile station K) generates the measurement information (i.e., the feedback information), which was transmitted by the corresponding heterogeneous mobile station (e.g., mobile station 2, mobile station 3, . . . mobile station K), as a bitmap or table format and is then able to transmit the generated measurement information to the serving base station of the mobile station 1 110.

Alternatively, without performing the steps S220 to S240, the base station (i.e., the serving base station of the corresponding heterogeneous mobile station (e.g., mobile station 2, mobile station 3, . . . mobile station K)) of the heterogeneous network, which has received the request message such as AAI-MR-REQ, an indicator and the like from the serving base station of the mobile station 1 110, is able to transmit necessary information requested by the serving base station of the mobile station 1 110 to the serving base station of the mobile station 1 110 using the information transmitted by each of the mobile stations using the corresponding radio to its serving base station. In this case, the information transmitted by each of the heterogeneous mobile stations to the base station, to which the corresponding heterogeneous mobile station belongs, means a channel status information, a channel quality, a signal to interference plus noise ratio (SINR), a carrier to interference plus noise ration, an interference level, a channel status, a received signal strength indicator, a beam pattern, a precoding matrix index (PMI) and the like.

Having received all information on a specific radio from the serving base stations of the heterogeneous mobile stations, the serving base station of the mobile station 1 110 is able to select a heterogeneous network available for the mobile station belonging to the serving base station of the mobile station 1 110 based on the received information. The serving base station of the mobile station 1 110 selects the information, which is required for the mobile station 1 110 to transmit a signal, from the selected heterogeneous network and is then able to transmit the selected information to the mobile station 1 110 [S260]. Moreover, in case that the serving base station of the mobile station 1 110 receives the information on a specific channel or resource of the heterogeneous network and the like from the base station of each of the at least one heterogeneous network, it is able to directly transmit the corresponding received information to the mobile station 1 110. In doing so, the serving base station of the mobile station 1 110 is able to transmit information on a channel or resource region allocated to the mobile station 1 110. Additionally, the serving base station of the mobile station 1 110 is able to transmit a measurement request for the heterogeneous network to the mobile station 1 110.

Having received the information on the heterogeneous network from the serving base station, the mobile station 1 110 is able to directly transmit and receive signals via the heterogeneous network using the received information [S270]. Alternatively, if the mobile station 1 110 receives the measurement request message (e.g., AAI_MR-Indictor, AAI_MR-REQ) for the heterogeneous network from the serving base station, the mobile station 1 110 performs a measurement on the heterogeneous network allocated by the serving base station for a plurality of optimal RATs (i.e., multi-RAT) (e.g., measure a channel status, SINR, interference level and the like between the mobile station and the heterogeneous network) and is then able to transmit the measurement result to the serving base station [S280].

The serving base station of the mobile station 1 110 determines an optimal heterogeneous channel, an optimal resource region information and the like using the heterogeneous network channel measured by the mobile station 1 110 and the feedback information (measurement information) of the mobile station 1 110 for the resource and is then able to transmit the determined information to the mobile station 1 110 [S290]. Afterwards, the mobile station 1 110 is able to transmit and receive signals via the heterogeneous network using the optimal heterogeneous network channel and the optimal resource region information.

In FIG. 2, a base station (e.g., a serving base station of a mobile station 1 110) of a specific RAT or a specific network requests information required for the mobile station 1 110 belonging to the corresponding base station to transmit/receive (transceive) signals with a different RAT or a different network. On the contrary, a base station (e.g., a serving base station of a mobile station 1 110) of a specific RAT or a specific network is able to provide a service enabling the mobile station 1 110 belonging to the corresponding base station to transmit and receive signals via heterogeneous networks (or multiple RATs) using information (e.g., a channel status (idle/busy), a channel quality, an interference level, an SINR, an RSSI, etc.) transmitted periodically or according to event occurrence from a different RAT or a different network.

For instance, the information, which is received by the serving base station of the mobile station 1 110 from at least one or more heterogeneous networks (or at least one or more RATs), includes information (e.g., channel ID, channel status, RSSI, channel quality information (CQI), precoding matrix index (PMI), carrier to interference plus noise ratio (CINR), signal to interference plus noise ratio (SINR), interference level, etc.) currently used for transmission and reception by heterogeneous mobile stations provided with services by base stations of the at least one or more heterogeneous networks. In this case, in order for the mobile station 1 110 to transmit and receive signals via the at least one heterogeneous network (or at least one RAT), the serving base station of the mobile station 1 110 is able to allocate an optimal channel to the mobile station 1 110 by avoiding channels currently used by the at least one heterogeneous network using the above informations. This is described in detail as follows.

Figure 3:
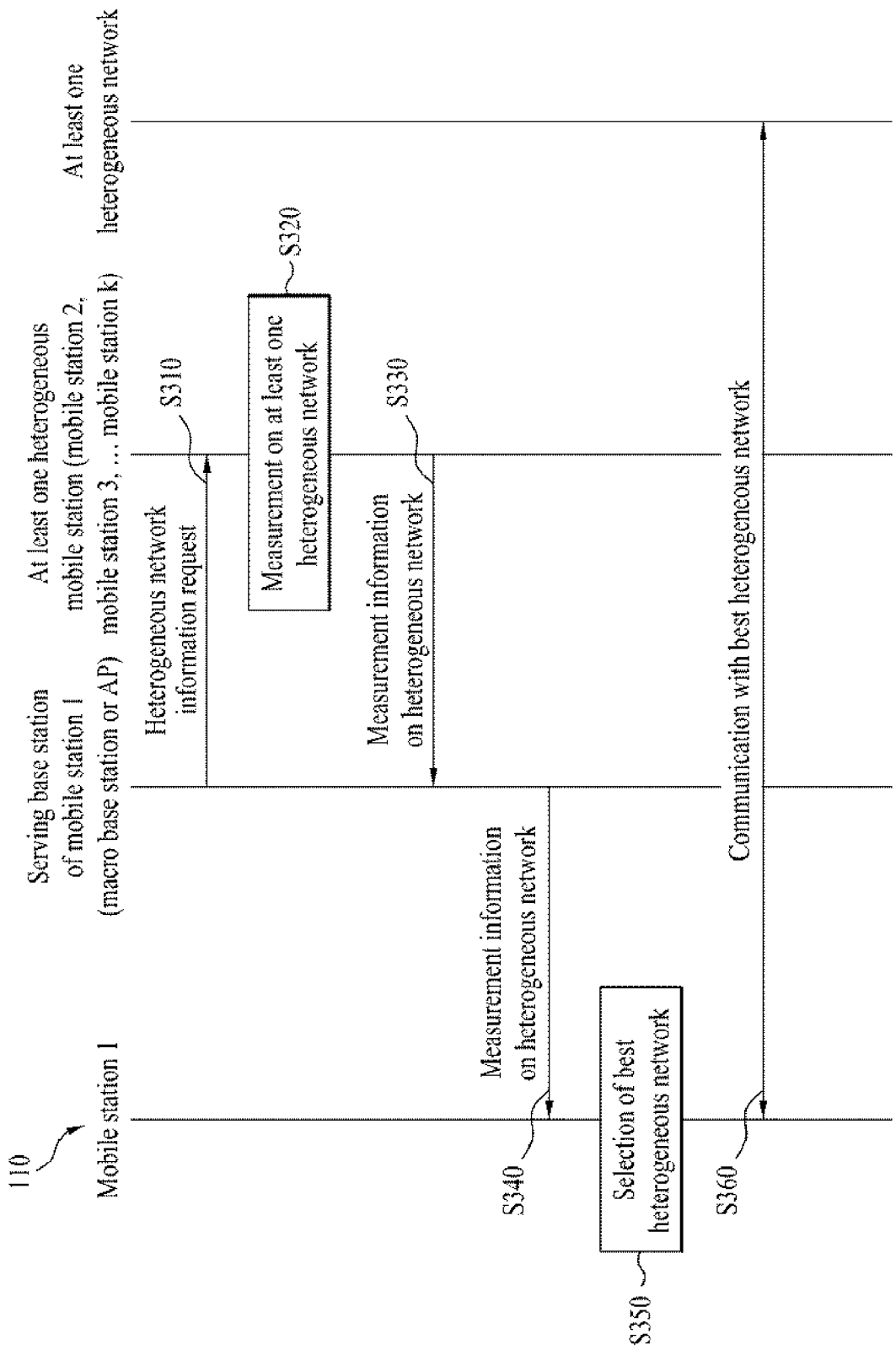
FIG. 3 is a diagram for one example of a process for a mobile station to obtain information on a heterogeneous network.

FIG. 3 is a diagram for one example of a process for a mobile station to obtain information on a heterogeneous network.

Referring to FIG. 3, in order for a mobile station 1 110 to obtain information on a heterogeneous network, a serving base station is able to make a request for the information on the heterogeneous network to a mobile station of the heterogeneous network using AAI_MR-REQ, a measurement signal or the like. In this case, each heterogeneous mobile station (e.g., mobile station 2, mobile station 3, . . . mobile station K) having received the request signal detects a signal of the corresponding heterogeneous network and then transmits the information on the corresponding heterogeneous network to the serving base station (e.g., the serving base station of the mobile station 1 110) having made the request. In this case, each of the heterogeneous mobile stations having received the request message/signaling for the information on the heterogeneous network is able to transmit the information on the network, to which the corresponding heterogeneous mobile station belongs, to the heterogeneous base station (e.g., the serving base station of the mobile station 1 110) only.

In doing so, in order to reduce a power, complexity and time used for a mobile station to measure a heterogeneous network, the mobile station is able to perform a measurement on the heterogeneous network using a list of heterogeneous networks, which was transmitted to mobile stations within a cell by a serving base station of the corresponding mobile station.

According to an embodiment of the above description, referring to FIG. 3, a serving base station of a mobile station 1 110 is able to make a request for a heterogeneous network to heterogeneous mobile stations (e.g., mobile station 2, mobile station 3, . . . mobile station K) [S310]. In doing so, the serving base station of the mobile station 1 110 is able to send an information request (or measurement request) message for the heterogeneous network to each of the heterogeneous mobile stations by broadcasting, multicasting or unicasting [S310]. And, the measurement request message sent to each of the heterogeneous mobile stations by the serving base station of the mobile station 1 110 can contain information (e.g., a heterogeneous system type, a heterogeneous system number, a bandwidth, a center frequency, an OFDMA parameter, a channel ID, etc.) which should be measured by the corresponding heterogeneous mobile station. In particular, the serving base station of the mobile station 1 110 previously specifies heterogeneous systems supposed to be measured by the heterogeneous mobile stations and then informs the heterogeneous mobile stations of the specified heterogeneous systems, in consideration of the power consumptions of the mobile stations. Thereafter, at least one heterogeneous mobile station measures the information on the heterogeneous network [S320] and is then able to transmit the measurement result to the serving base station of the mobile station 1 110 [S330].

On the other hand, even if the measurement request for the heterogeneous network is not made by the serving base station of the mobile station 1 110, each of the heterogeneous mobile stations is able to perform a measurement of a channel status and the like for the corresponding heterogeneous network, to which the corresponding heterogeneous mobile station belongs, to transmit signals using a plurality of RATs [S320]. In particular, each of the heterogeneous mobile stations is able to measure information on the heterogeneous network in accordance with a predetermined period (e.g., long term or short term) or an event occurrence [S320]1. Thereafter, each of the heterogeneous mobile stations is able to transmit the measured information on the heterogeneous network to the serving base station of the mobile station 1 110 [S330]. And, the serving base station of the mobile station 1 110 is then able to transmit the corresponding information to the mobile station 1 110 [S340].

Subsequently, the mobile station 1 is able to select a best heterogeneous network (or system) for the mobile station 1 110 to transmit and receive signals in consideration of a channel status (e.g., a channel quality, an SINR, an interference level, a channel ID, a channel matrix, a modulating and coding scheme (MCS) level, a traffic, a presence or non-presence of idle/busy mode, etc.) of each of the heterogeneous networks (or systems) measured by the corresponding heterogeneous mobile station in the step S320 and a channel status (e.g., a channel quality, an SINR, an interference level, a channel ID, a channel matrix, a modulating and coding scheme (MCS) level, a traffic, a presence or non-presence of idle/busy mode, etc.) with the serving base station [S350]. The mobile station 1 110 makes a request for a communication with the selected best heterogeneous network to the serving base station and is then able to transmit and receive signals via the best heterogeneous network [S360].

In doing so, the mobile station 1 110 transceives signals with the serving base station and the heterogeneous network simultaneously or is able to receive service allocation from the serving base station and the heterogeneous network simultaneously. Alternatively, the mobile station 1 110 is able to receive service allocation from one heterogeneous network or several heterogeneous networks. And, the mobile station 1 110 is able to set a channel with an optimal heterogeneous network using a previously set threshold value to determine a best heterogeneous network. In this case, the threshold value can be transmitted to the mobile station 1 110 by the serving base station of the mobile station 1 110. And, the threshold value can be determined based on the information measured and transmitted by each of the heterogeneous mobile stations.

Having received the information on the heterogeneous network from the heterogeneous mobile stations, the serving base station of the mobile station 1 110 determines the best heterogeneous network suitable for the mobile station 1 110 and channel information available for the corresponding network using the corresponding informations and is then able to signal them to the mobile station. Having received the information on the heterogeneous network for a plurality of RATs (multi-RAT) from the serving base station, the mobile station 1 110 is able to transmit/receive signals using the received information or the corresponding RAT or heterogeneous network.

In the descriptions with reference to FIG. 2 and FIG. 3, the serving base station of the mobile station 1 110 performs initialization for performing a multi-RAT operation, by which the present invention is non-limited. Alternatively, the initialization for performing the multi-RAT operation in FIG. 2 or FIG. 3 can be performed by the mobile station 1 110.

In particular, the mobile station 1 110 is able to make a request for heterogeneous network information to the serving base station for performing the multi-RAT operation. If so, the serving base station is able to make a request for heterogeneous network information to at least one heterogeneous network (e.g., the case shown in FIG. 2) or at least one heterogeneous mobile station (e.g., the case shown in FIG. 3). Thereafter, the procedure including the steps S220 to S290 shown in FIG. 2 or the procedure including the steps S320 to S360 shown in FIG. 3 can be performed.

Alternatively, the following method is possible. First of all, a mobile station 1 110 directly measures information on at least one heterogeneous network. Secondly, the mobile station 1 110 makes a request for a multi-RAT operation with a desired heterogeneous network. Thirdly, the multi-RAT can be executed.

As mentioned in the above description, a specific mobile station is able to transmit and receive data (or signals) using a heterogeneous network based on the heterogeneous network information obtained by the above method described with reference to FIG. 3. For instance, in order for a specific mobile station to transmit and receive signals via multiple RATs using WiMAX and WiFi, information on a heterogeneous network is required. In case that each heterogeneous mobile station measures the information on the heterogeneous network, since a WiFi mobile station using an unlicensed band is unable to use a licensed band, the measurement on the unlicensed band is impossible. Therefore, the WiMAX mobile station operable on the licensed band needs to measure information on WiFi transmission in a manner of measuring WiFi signal by simultaneously receiving an unlicensed band (ISM (industrial scientific and medical) band) or by performing band switching.

Generally, in case of WiFi, a plurality of channels exist within a specific frequency band. A specific mobile station using WiFi is able to perform a communication via at least one specific channel selected from a plurality of the channels. In doing so, if a plurality of mobile stations select the same channel and then attempt communications, the corresponding collision probability is raised to increase latency. As a method for solving such a problem, it is able to consider that a specific network is enabled to control physical channel resources of a different network in a heterogeneous network existing environment. If a specific network adjusts physical channel resources of a different network, it is able to lower the collision probability and the latency.

For instance, when a specific mobile station (e.g., mobile station 1 110) uses WiFi, a base station of a first network (e.g., WiMAX base station) is able to instruct the mobile station 1 110 of a channel or a channel group, which is to be actually used within WiFi band, by broadcast, multicast or unicast signaling. In order to transmit and receive signals in WiFi network, each mobile station belonging to the network receives allocation of a channel for signal transmission and reception using a contention-based access scheme and then reeves a service from a serving base station. Yet, as mentioned in the above description, if a serving base station transmits information on a heterogeneous network (e.g., a heterogeneous network to be accessed and a channel or resource region to be used for signal transmission and reception within a heterogeneous network) to a mobile station 1 110, which is to perform a multi-RAT operation, for the multi-RAT operation, the mobile station 1 110 uses WiFi channel instructed by a base station of a first network (e.g., macro base station of WiMAX) without contention with other mobile stations or is able to raise channel allocation opportunity. Thus, if a base station of a first network (e.g., WiMAX base station) allocates WiFi channel to at least one multi-RAT operable mobile station, the WiFi channel can be allocated with minimum contention or without contention. Therefore, numerous multi-RAT operable mobile stations within the first network (e.g., WiMAX) are able to use the WiFi stably. Thus, scheduling or lad balancing is necessary to reduce collisions due to the WiFi use by numerous multi-RAT operable mobile stations within a first network. And, a base station of the first network is able to lower collision probability and latency by performing the scheduling or load balancing on such a heterogeneous network.

Moreover, a base station of a first network (e.g., WiMAX) is able to allocate a channel or a channel group for a specific purpose among communication channels of a second network (e.g., WiFi) as well as a channel or a channel group for a basic communication. For instance, if a mobile station 1 110 performs an emergency service communication, the base station of the first network enables the mobile station 1 110 to use a specific resource allocation different from a basic allocation of resource.

Although the above-mentioned description is made in aspect of the load balancing only, it is a useful example for a case that a measurement of a different network is not available. If the measurement of the different network is actually available, scheduling in consideration of a channel quality, a load and the like is possible. Channels of a second network instructed by the base station of the first network can include center frequencies different from each other or time or frequency resources different from each other.

Therefore, in order for a mobile station 1 110 to transmit a signal in a heterogeneous network using multiple RATs, it is preferable that a channel for enabling a heterogeneous mobile station to transmit a signal is allocated. A base station of a first network (e.g., a macro base station of WiMAX) is able to allocate a channel of a heterogeneous network for using multiple RATs to a mobile station 1 110. Such an allocating method is further described as follows.

Method 1 for Allocating a Second Network (e.g., WiFi) Channel to a Mobile Station 1

First of all, a base station of a first network (e.g., a macro base station of WiMAX) enables a WiMAX mobile station or a WiFi mobile station to perform detection or measurement on all channels used by WiFi system within ISM band that is an unlicensed band. And, the base station of the first network (e.g., the macro base station of WiMAX) preferentially allocates a channel in idle mode, an unused channel or a channel having a good channel quality among channels within the ISM band to the mobile station 1 110 and then enables the mobile station 1 110 to transmit and receive signals via multiple RATs. Moreover, the base station of the first network (e.g., the macro base station of WiMAX) is able to allocate a channel having an idle channel status, a currently unused channel or a plurality of channels (e.g., a channel group) among channels having good channel quality to the mobile station 1 110. In this case, a plurality of the channels are situated contiguously or in a manner of being spaced apart from each other.

Figure 4:
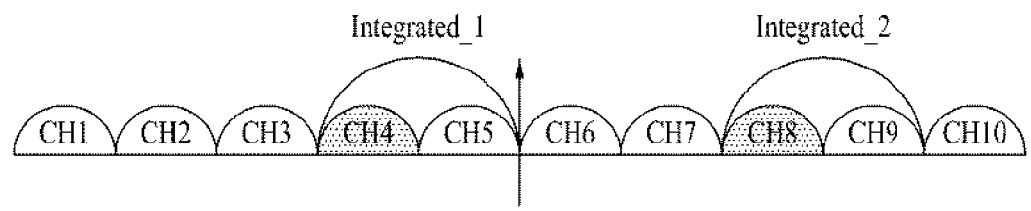
FIG. 4 is a diagram for describing one example of a method for a base station of a first network to perform channel allocation in a second network.

FIG. 4 is a diagram for describing one example of a method for a base station of a first network to perform channel allocation in a second network.

Regarding the description with reference to FIG. 4, a first network (e.g., WiMAX) and a second network (e.g., WiFi) correspond to heterogeneous networks. A base station of the first network is able to allocate a channel in the second network (e.g., WiFi), which is the heterogeneous network, to a mobile station 1 110.

For instance, referring to FIG. 4, if channel 4 and channel 5 contiguous with each other are currently in idle mode, a base station of a first network is able to allocate the two channels as a channel group 1 channel (Integrated 1) to a mobile station 1 110 (e.g., WiMAX mobile station). And, the mobile station 1 110 is able to transmit/receive signals with a base station of a second network via the channel group 1 (i.e., channel 4 and channel 5). Thus, in case that the base station of the first network allocates the channel group 1 to the mobile station 1 110, the mobile station 1 110 is able to select channel(s) to use for communication actually from a plurality of channels. In doing so, the channel to be actually used for the communication can be selected randomly, by a method defined in a second network, a channel quality priority based on measurement on channels of the second network, signaling or the like.

Method 2 of Allocating Channel of a Second Network (e.g., WiFi) to a Mobile Station 1

First of all, a base station of a first network (e.g., a macro base station of WiMAX) mentioned in the foregoing description is able to inform mobile stations including a mobile station 1 110, which are served by the base station of the first network, of a channel or a channel group, which is to be used in a second network (e.g., WiFi) in consideration of scheduling and load balancing for reducing collisions between mobile stations in the second network (e.g., WiFi). The base station of the first network (e.g., the macro base station of WiMAX) is able to previously determine a channel, which is to be used by a mobile station in performing a multi-RAT operation within each serving base station, for all channels within a band used by the second network (e.g., WiFi). Therefore, even if a specific mobile station uses multiple RATs, it is able to transmit/receive signals (or data) with the second network using the previously determined channel.

For example of a method for a base station of a first network (e.g., a macro base station of WiMAX) to allocate a channel of a second network, the base station of the first network (e.g., the macro base station of WiMAX) is able to assign a WiMAX mobile station to a second network (WiFi) channel in consideration of a lad balancing or traffic per channel shown in FIG. 4. Moreover, in case that a fixed channel is used for a multi-RAT operation in a heterogeneous network per mobile station in order to transmit and receive signals using multiple RATs per mobile station, a base station of a first network (e.g., a macro base station of WiMAX) is able to transmit allocated channel information in a bitmap or table format to each mobile station.

Method 3 of Allocating Channel of a Second Network (e.g., WiFi) to a Mobile Station 1

Using information on a second network (e.g., WiFi) channel measured by a base station of a first network (e.g., a macro base station of WiMAX) or mobile stations belonging to the base station of the first network or a heterogeneous network, the base station of the first network (e.g., the macro base station of WiMAX) is able to obtain a status of each channel. The base station of the first network (e.g., the macro base station of WiMAX) performs ordering on the channels in accordance with the obtained channel status and then allocates the channels to the WiMAX mobile stations in order of the ordering result, thereby facilitating the mobile stations to use the channel of the heterogeneous network to perform a multi-RAT operation. In case that the multi-RAT operation is performed, an optimal channel can be allocated. In this case, the ordered channel information can be represented in a bitmap format.

Method 4 of Allocating Channel of a Second Network (e.g., WiFi) to a Mobile Station 1

First of all, a base station of a first network (e.g., a macro base station of WiMAX) is able to control a channel of a second network (e.g., WiFi) in consideration of scheduling and load balancing to reduce the aforesaid collision between mobile stations. In case that a WiMAX mobile station belonging to the first network transmits a signal via a WiFi channel o the second network, the base station of the first network is able to determine a channel for transmitting an initial signal in a heterogeneous network (i.e., WiFi herein) only. If the base station of the first network transmits a channel hopping sequence, a switching sequence, or a parameter related thereto to the WiMAX mobile station, the WiMAX mobile station is able to use the WiFi channel of the second network in accordance with a determined pattern. In this case, the hopping or switching sequence related parameter transmitted to the WiMAX mobile station by the base station of the first network can be used by a mobile station or a mobile station group in common or can be used in common per cell. And, the hopping or sequence related parameter can be transmitted to a mobile station by setting a dedicated code. In this case, the hopping sequence can be generated by performing a cyclic shift on a single sequence.

Figure 5:
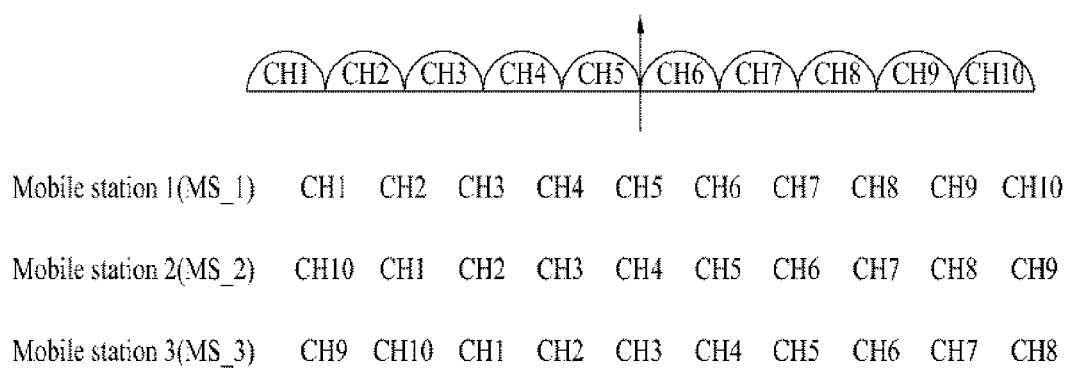
FIG. 5 is a diagram for one example of channels allocated to each mobile station according to a cyclic shift channel hopping pattern in a second network (e.g., WiFi)

FIG. 5 is a diagram for one example of channels allocated to each mobile station according to a cyclic shift channel hopping pattern in a second network (e.g., WiFi).

First of all, a base station of a first network (e.g., a macro base station of WiMAX) is able to transmit a channel hopping sequence related parameter to each mobile station belonging to the first network only. And, each mobile station is then able to receive allocation of a channel in accordance with a hopping sequence for the received parameter. In this case, the channel for the channel can be performed in accordance with one of a predetermined time period, a data transmission count and the like. The base station of the first network (e.g., the macro base station of WiMAX) creates a hopping pattern used by each mobile station into a table and is then able to transmit the table in such a format as a bitmap. Moreover, each mobile station can implicitly acquire a hopping pattern from a mobile station ID. For instance, a first hopping pattern of a mobile station is determined as 'mod (MS ID, hopping sequence number)' and allocation can be then performed in accordance with the determined pattern. On the contrary, a whole pattern in consideration of time can be allocated as a function of the mobile station ID.

Referring to FIG. 5, channels (e.g., channel 1 to channel 10) of a second network can be allocated to each mobile station (e.g., mobile station 1, mobile station 2, mobile station 3) in a manner of being hopped by a cyclic shift scheme. Hence, the channels used by each of the mobile stations are not overlapped with each other.

Method 5 of Allocating Channel of a Second Network (e.g., WiFi) to a Mobile Station 1

First of all, in order for a mobile station belonging to a first network to transmit a signal via a channel of a second network that is a heterogeneous network, as mentioned in the foregoing description, a base station of a first network (e.g., a macro base station of WiMAX) sets a channel for performing an initial transmission via the heterogeneous network per mobile station and is then able to allocate a channel suitable for transmitting a signal by measuring a status of a channel for a next transmission.

Thus, in order for a mobile station, which receives a signal via a base station (e.g., a relay base station, a femto base station, etc.), to transmit and receive signals using multiple RATs, it is necessary for the mobile station to receive allocation of information on a resource and channel used by a heterogeneous network or a different RAT from the base station. Moreover, if channel is allocated using one of the above-described methods 2, 4 and 5 of allocating a second network channel (e.g., WiFi channel) to a mobile station 1 110, it is able to reduce complexity and unnecessary measurement for transceiving signals in a heterogeneous network. And, the mobile station 1 110 receives a channel more quickly to transmit data efficiently.

In case that a mobile station 1 110 belonging to a first network is going to transmit and receive signals via a channel of a second network by detecting or measuring a channel status of the second network that is a heterogeneous network, a serving base station of the mobile station 1 110 informs a different mobile station, which belongs to the serving station of the mobile station 1 110, of information on the second network and channel allocated to the mobile station 1 110 (or information on an available heterogeneous network and channel) as well as the mobile station 1 110, whereby it is able to reduce an unnecessary detection or measurement for the second network in order for the different mobile station to receive a service via the second network. Moreover, if the serving base station of the mobile station 1 110 transmits a second network information (e.g., channel information, resource information, etc.) allocated to a different mobile station belonging to the first network to the different mobile station as well as the mobile station 1 110, signals can be transmitted and received by avoiding being overlapped with each other in case of heterogeneous network channel selection between mobile stations.

In case that the serving base station of the mobile station 1 110 is going to allocate a specific channel of the second network to the mobile station 1 110 in accordance with a request (e.g., a request for a multi-RAT operation via a message such as AAI_MR_REQ or signaling) made by the mobile station 1 110, the serving base station of the mobile station 1 110 is able to allocate an optimal channel to the mobile station 1 110 by avoiding a second network channel allocated to a different mobile station to enable other mobile stations belonging to the first network to transmit and receive signals via the second network.

In case that there exist a base station and a mobile station, which are operable by multiple RATs, it is able to obtain an operating environment of RAT through the aforesaid various measurements (e.g., channel status, etc.) for a network that uses a different RAT. Consequently, since a base station can be aware of an interference situation of a specific RAT, a traffic load, a channel quality and the like for the specific RAT, scheduling for a different band can be limited. For instance, a scheme of using a specific time resource and a specific frequency resource, a scheme of rejecting a specific time and a specific frequency, or a scheme of adjusting a position of an operating frequency of an entity becoming a coordinator such as an access point (AP) of a corresponding RAT can be applied to a mobile station that uses WiFi or a similar unlicensed band in a cellular network. In this case, a base station designates a specific resource to a mobile station to support a use of an AP or network using the corresponding resource or is able to being an effect that the mobile station avoids a corresponding region. Moreover, in order for a mobile station to change an operation of a specific RAT, it is able to move an operating region of the RAT via time or frequency information that designates an operation of AP.

In the following description, an embodiment of a method for the aforesaid base station of the first network to allocate a channel of the second network, which is the heterogeneous network, to the mobile station 1 110 belonging to the network of the base station is explained.

First of all, if a base station of a first network instructs a mobile station 1 110 to move a frequency of a specific AP, which is a base station of a second network, to a channel A, the mobile station 1 110 transmits a corresponding information to the corresponding AP to move an operating frequency of the AP to the channel A. Moreover, if the base station of the first network instructs the mobile station 1 110 to avoid a channel C, the mobile station 1 110 makes an access by searching the rest of channels except the channel C or can receive an instruction of a channel to access by making a report to the base station of the first network. If the base station of the first network instructs the mobile station 1 110 to transmit and receive signals by accessing a specific channel F, the mobile station 1 110 accesses the corresponding channel and is then able to transmit and receive signals. Alternatively, if the mobile station 1 110 already accesses the corresponding channel, it is able to directly transmit and receive signals.

If the base station of the first network instructs a frequency channel access of the mobile station 1 110 at a specific timing point, the mobile station 1 110 makes an access at the corresponding timing point or is able to perform a channel shift. If the mobile station 1 110 receives an instruction of a channel measurement at a specific timing point or a specific channel of a second network from the base station of the first network, the mobile station 1 110 measures a signal status from a base station (e.g., AP) of the second network or a network status and is then able to report the measurement information to the base station of the first network, which is a serving base station, via a specific resource designated by the base station of the first network. Moreover, the base station (e.g., AP) of the second network is able to report a measurement value for information designated by the mobile station 1 110 or the base station of the first network via a resource designated by the base station of the first network or the mobile station 1 110. And, the mobile station 1 110 is able to transmit the corresponding information to the base station of the first network again.

A base station (or AP) or a mobile station is able to perform a function of reserving a channel for a channel use in a specific RAT under coordination of the base station. The channel reservation utilizes a protocol used by the corresponding RAT or is able to utilize such information as NAV in case of WiFi or the like. In order to maintain the channel reservation, the base station or the mobile station is able to periodically send a reservation available signal of a predetermined format. In doing so, the signal transmission and reception on channel can be maintained in a direct transmission/reception available state under the coordination of the base station.

In order to utilize a frequency used by a specific RAT, in case that a specific frequency resource is being used by a random mobile station or RAT, a base station is able to instruct the mobile station or an AP of the corresponding AP to empty the specific frequency. If the specific frequency resource is in an available status, the base station is able to freely access a specific frequency band/channel. And, the base station is able to additionally provide the mobile station with the frequency resource in the available status using a specific RAT used by the base station. Moreover, the base station is able to provide the mobile station with a service via another specific RAT.

When a base station utilizes a specific frequency resource, even if the base station uses an RAT similar to that serviced by the base station, cell information can be set to have an attribute different from that of a macro cell. In particular, by setting a cell size, a power level of a signal and the like differently, it is able to secure space utilization of the specific frequency resource and coexistence with a different primary RAT.

Although a target frequency resource for the contents related to the method for the base station of the first network to allocate the channel of the second network is an unlicensed band. Yet, those contents are actually applicable to a licensed band in a similar manner. And, a range from TV white space to ISM band is utilizable as the corresponding frequency band.

For clarity and convenience of the former descriptions, the first network allocates the channel of the second network. Yet, the corresponding channel can be selected without an actually transmitted indicator. For instance, if a channel allocation is previously defined in accordance with a specific function using a station ID, a MAC ID or the like, channel can be selected without signaling.

Figure 6:
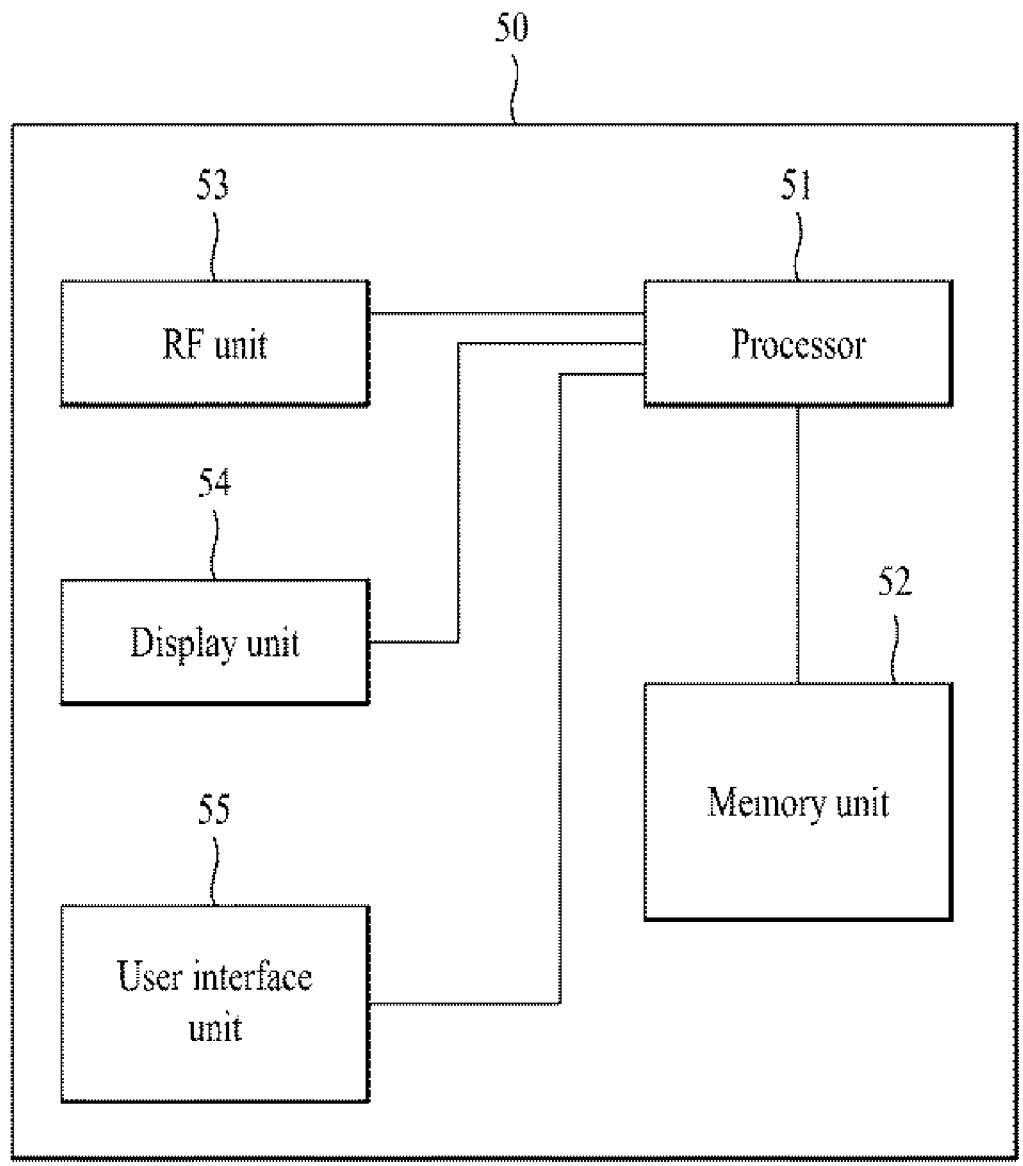
FIG. 6 is a diagram for components of a device 50.

FIG. 6 is a diagram for components of a device 50. Referring to FIG. 6, a device 50 can include a mobile station or a base station. And, the device 50 includes a processor 51, a memory unit 52, an RF (radio frequency) unit 53, a display unit 54 and a user interface unit 55. Layers of a radio interface protocol are implemented within the processor 51. The processor 51 provides a control plane and a user plane. A function of each of the layers can be implemented within the processor 51. The processor can include a contention resolution timer. The memory unit 52 is connected to the processor 51. And, an operating system, applications and general files are stored in the memory unit 52. If the device 50 is a user equipment (UE), the display unit 54 is able to display various kinds of informations. And, the display unit 54 can be implemented using such a well-known component as an LCD (liquid crystal display), an OLED (organic light emitting diode) display and the like. The user interface unit 55 can be configured by being combined with such a well-known user interface as a keypad, a touchscreen and the like. The RF unit 53 is connected to the processor 51. The RF unit 53 transmits or receives a radio signal. The RF unit 53 is able to include a transmitting module (not shown in the drawing) and a receiving module (not shown in the drawing). The RF unit 53 receives control information including zone allocation information. And, the processor 51 controls the terminal device 50 to perform communication with a base station via a corresponding zone based on the zone allocation information.

The layers of the radio interface protocol between a user equipment and a network can be classified into a first layer (L1), a second layer (L2) and a third layer (L3) based on 3 lower layers of OSI (open system interconnection) model well-known in communication systems. A physical layer or a PHY layer belongs to the first layer and provides an information transfer service via a physical channel. RRC (radio resource control) layer belongs to the third layer and provides control radio resources between the UE and the network. And, the UE and the network exchange RRC messages with each other via the RRC layers.

The above-described embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Base station and method of supporting a mobile station (MS) to perform a communication using a plurality of networks is industrially applied to mobile communication system such as 3GPP LTE, LTE-A, IEEE 802, etc.

The invention claimed is:

1. A method of supporting a mobile station (MS) to perform a communication using a plurality of networks in a mobile communication system, the method comprising:
receiving, at a serving base station (BS) of the MS, information on at least one heterogeneous network from a base station of each of the at least one heterogeneous network;
determining, at the serving BS, a heterogeneous network to be allocated to the MS and a channel of the heterogeneous network based on the information on the at least one heterogeneous network,
wherein the channel of the heterogeneous network to be allocated to the MS is allocated in accordance with a predetermined rule among all channels of the heterogeneous network, and
wherein the predetermined rule is determined using an MS identifier (ID) and a channel hopping sequence; and
transmitting, at the serving BS, information on the determined heterogeneous network to the MS.

2. The method of claim 1, further comprising:
transmitting, at the serving BS, a request for the information on the heterogeneous network to the base station of each of the at least one heterogeneous network.

3. The method of claim 1, further comprising:
transmitting, at the serving BS, a request for a channel status measurement for the channel of the allocated heterogeneous network to MS;
receiving, at the serving BS, a channel status measurement result for the channel of the allocated heterogeneous network from the MS; and
allocating, at the serving BS, a specific channel having a best channel status to the MS based on the channel status measurement result.

4. The method of claim 1, wherein the information on the at least one heterogeneous network includes information on the channel status between the MS and each of the at least one heterogeneous network.

5. The method of claim 4, wherein the information on the channel status includes at least one of an interference level, a signal to interference plus noise ratio (SINR), a carrier to interference plus noise ratio, a received signal strength indicator, a beam pattern and a precoding matrix index (PMI).

6. The method of claim 1, wherein the channel of the heterogeneous network comprises a plurality of channels.

7. A base station (BS) for supporting a mobile station (MS) to perform a communication using a plurality of networks in a mobile communication system, the method comprising:
a receiving module configured to receive information on at least one heterogeneous network corresponding to a heterogeneous for the MS from the BS of each of the at least one heterogeneous network;
a processor configured to determine a heterogeneous network to be allocated to the mobile station and a channel of the heterogeneous network based on the received information on the at least one heterogeneous network, wherein the channel of the heterogeneous network to be allocated to the MS is allocated in accordance with a predetermined rule among all channels of the heterogeneous network, and wherein the predetermined rule is determined using an MS identifies (ID) and a channel hopping sequence; and a transmitting module configured to transmit information on the determined heterogeneous network to the MS.

8. The BS of claim 7, further comprising:
a transmitting module configured to transmit a signal for requesting the information on the heterogeneous network to the BS of each of the at least one heterogeneous network.

9. The BS of claim 7, further comprising:
a transmitting module configured to transmit a signal for requesting a channel status measurement for the channel of the allocated heterogeneous network to the MS;
a receiving module configured to receive a channel status measurement result for the channel of the allocated heterogeneous network from the MS; and
a processor configured to allocate a specific channel having a best channel status to the MS based on the channel status measurement result.

10. The BS of claim 7, wherein the information on the at least one heterogeneous network includes information on the channel status between the MS and each of the at least one heterogeneous network.

11. The BS of claim 10, wherein the information on the channel status contains at least one of an interference level, a signal to interference plus noise ratio (SINR), a carrier to interference plus noise ratio, a received signal strength indicator, a beam pattern and a precoding matrix index (PMI).

12. The BS of claim 7, wherein the channel of the heterogeneous network comprises a plurality of channels.

* * * * *